(12) United States Patent
Statnikov et al.

(10) Patent No.: US 12,153,158 B2
(45) Date of Patent: Nov. 26, 2024

(54) METHODS AND SYSTEMS FOR CALIBRATING A RADAR SENSOR

(71) Applicant: Aptiv Technologies AG, Schaffhausen (CH)

(72) Inventors: Konstantin Statnikov, Düsseldorf (DE); Carlos A. Alcalde, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 246 days.

(21) Appl. No.: 17/502,000

(22) Filed: Oct. 14, 2021

(65) Prior Publication Data

US 2022/0120854 A1    Apr. 21, 2022

(30) Foreign Application Priority Data

Oct. 15, 2020 (EP) .................................... 20202060

(51) Int. Cl.
    *G01S 7/40*      (2006.01)
    *G01S 5/06*      (2006.01)
    *G01S 13/931*    (2020.01)

(52) U.S. Cl.
    CPC ........ *G01S 7/40* (2013.01); *G01S 5/06* (2013.01); *G01S 13/931* (2013.01)

(58) Field of Classification Search
    CPC ............. G01S 7/40; G01S 5/06; G01S 13/931
    USPC ............................. 342/174, 360, 458, 357.42
    See application file for complete search history.

(56) References Cited

U.S. PATENT DOCUMENTS

| | | | |
|---|---|---|---|
| 9,945,929 B2* | 4/2018 | Hehn | G05D 1/101 |
| 10,559,878 B2* | 2/2020 | Rezvani | H01Q 25/001 |
| 2015/0070207 A1* | 3/2015 | Millar | G01S 13/4454 342/174 |
| 2018/0113195 A1* | 4/2018 | Bialer | G01S 13/86 |
| 2019/0369222 A1* | 12/2019 | Oh | G05D 1/0257 |

FOREIGN PATENT DOCUMENTS

| | | |
|---|---|---|
| CN | 102544755 | 12/2013 |
| EP | 3279683 | 2/2018 |
| EP | 3318889 | 5/2018 |

OTHER PUBLICATIONS

"Extended European Search Report", EP Application No. 20202060.8, Mar. 22, 2021, 8 pages.

* cited by examiner

*Primary Examiner* — Bo Fan
(74) *Attorney, Agent, or Firm* — Michael P. Doerr (57) ABSTRACT

A computer implemented method for calibrating a radar sensor comprises the following steps carried out by computer hardware components: acquiring a plurality of radar detection data sets; for each of the plurality of radar detection data sets, determining an angle of arrival of the radar detection data under the assumption that the respective radar detection data set is related to a stationary object; for each of the plurality of radar detection data sets, determining a respective set of candidate entries of a calibration matrix of the radar sensor based on the respective angles of arrival determined for the respective plurality of radar detection data sets; and determining a set of entries of the calibration matrix of the radar based on the plurality of sets of candidate entries.

20 Claims, 12 Drawing Sheets

METHODS AND SYSTEMS FOR CALIBRATING A RADAR SENSOR

CROSS-REFERENCE TO RELATED APPLICATION

This application claims priority to European Patent Application Number 20202060.8, filed Oct. 15, 2020, the disclosure of which is hereby incorporated by reference in its entirety herein.

BACKGROUND

Radar sensors, which may for example be used in at least partially autonomously driving vehicles, must be calibrated. However, commonly used methods for calibration are cumbersome.

Accordingly, there is a need to provide enhanced methods for calibrating a radar sensor.

SUMMARY

The present disclosure relates to calibrating a radar sensor. More specifically, the present disclosure provides a computer implemented method, a computer system, a vehicle, and a non-transitory computer readable medium for calibrating a radar sensor according to the independent claims. Embodiments are given in the subclaims, the description and the drawings.

In one aspect, the present disclosure is directed at a computer implemented method for calibrating a radar sensor, the method comprising the following steps performed (in other words: carried out) by computer hardware components: acquiring a plurality of radar detection data sets; for each of the plurality of radar detection data sets, determining an angle of arrival of the radar detection data under the assumption that the respective radar detection data set is related to a stationary object; for each of the plurality of radar detection data sets, determining a respective set of candidate entries of a calibration matrix of the radar sensor based on the respective angles of arrival determined for the respective plurality of radar detection data sets; and determining a set of entries of the calibration matrix of the radar based on the plurality of sets of candidate entries.

The radar detection data set may include or may be a beamvector.

The method may provide a statistical radar on-line calibration method. The radar calibration method may apply statistical analysis to filter out non-stationary target responses.

The method may not need a factory calibration; it does not require initial radar sensor calibration (in other words: does not require partial calibration).

The method may have low computational complexity.

The method may be used as an additional source of information to "stabilize" a full matrix estimation procedure carried out for the online calibration task.

The method may provide an on-line calibration procedure for (non-calibrated) radar sensors. Beside range and Doppler measurement, angle finding (AF) may be a crucial step in radar signal processing. The method may allow a (non-calibrated) radar system to estimate the angle of arrival based on single-scatterer test and Doppler angle estimation method that is based on the vehicle's inertial measurement unit (IMU).

According to another aspect, the computer implemented method further comprises the following step carried out by the computer hardware components: for each of the plurality of radar detection data sets, determining whether the respective radar detection data set is related to a single scatterer.

It will be understood that various methods for implementing a single scatterer test (SST) are commonly available.

According to another aspect, the computer implemented method further comprises the following step carried out by the computer hardware components: disregarding radar detection data sets for which it is determined that they are not related to a single scatterer.

It has been found that the non-stationary targets may be identified and filtered out, so that the assumption for the determination of the angle of arrival (i.e. that the target objects are stationary) is fulfilled.

According to another aspect, the computer implemented method further comprises the following step carried out by the computer hardware components: determining odometry data related to an object (for example a vehicle) on which a sensor acquiring the plurality of radar detections data sets is mounted.

According to another aspect, the odometry data comprises a speed of the object and/or a yaw rate of the object. The odometry data may be determined based on a vehicles' motion model.

According to another aspect, the respective set of candidate entries is determined further based on the odometry data.

It has been found that including the odometry data, the relative speeds or velocities of stationary objects (relative to the object on which the sensor is mounted, for example vehicle) may be determined.

According to another aspect, each set of candidate entries comprises diagonal elements of the calibration matrix (in other words: the elements on the (main) diagonal of the calibration matrix).

It has been found that the diagonal elements of the calibration matrix are the most relevant elements to accommodate for angle-independent perturbations among array elements (caused by gain imbalance among the RF (radio frequency) channels, different length of antenna feedlines and others).

According to various embodiments, a square calibration matrix C may be used for the linear transformation of a measured array response, called steering vector x, to an ideal array response, called (ideal) steering vector a in the following way:

$$a = C \cdot x.$$

After this transformation (which may be called calibration), the angle of arrival estimation procedure can be carried out based on the obtained steering vector a.

According to another aspect, each set of entries comprises diagonal elements of the calibration matrix (in other words: the elements on the (main) diagonal of the calibration matrix).

According to another aspect, the computer implemented method further comprises the following step carried out by the computer hardware components: determining a Doppler frequency shift for each of the plurality of radar detection data sets.

According to another aspect, the respective set of candidate entries is determined based on the Doppler frequency shift.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system as described herein.

According to another aspect, the vehicle further comprises a radar sensor configured to acquire the plurality of radar detection data sets.

According to another aspect, the vehicle further comprises an odometry sensor configured to acquire the odometry data.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Angle finding (AF) is a crucial step in radar signal processing. However, a calibration matrix is needed to perform AF for single and multiple targets.

Commonly used calibration in the chamber may use many measurements for robustness and may thus be costly and time consuming.

In contrast thereto, according to various embodiments, an online calibration (in other words: calibration using targets from the actual scene, for example while a vehicle on which the radar sensor is provided is driving) may be provided.

Diagonal elements of the calibration matrix may be determined. The diagonal elements of the calibration matrix may be the most important as they serve to equalize the gain and phases of the array of antenna elements.

In Doppler radars, the measured range rate is the radial vector component of the true target's velocity vector. Therefore, range rate and angle information are coupled. In automotive radars, most targets are stationary. So statistically, for specific dynamical scenarios, measured range rate may serve for accurate AF for stationary targets.

According to various embodiments, single-scatterer beamvectors may be picked as candidates for angle-dependent diagonal calibration matrices. The needed angle correction may be estimated with (in other words: based on) the detection range rate and dynamic data from the vehicle.

The used estimation may, strictly speaking, be valid for stationary targets only. However, according to various embodiments, the estimation may be carried out under the assumption of stationary targets.

An angle-independent (diagonal) calibration matrix may be constructed by rotation with the corresponding ideal steering vector. Statistical analysis (for example robust averaging) may be applied to estimate the complex-valued diagonal elements of the calibration matrix, effectively by filtering out the non-stationary target responses.

Figure 2:
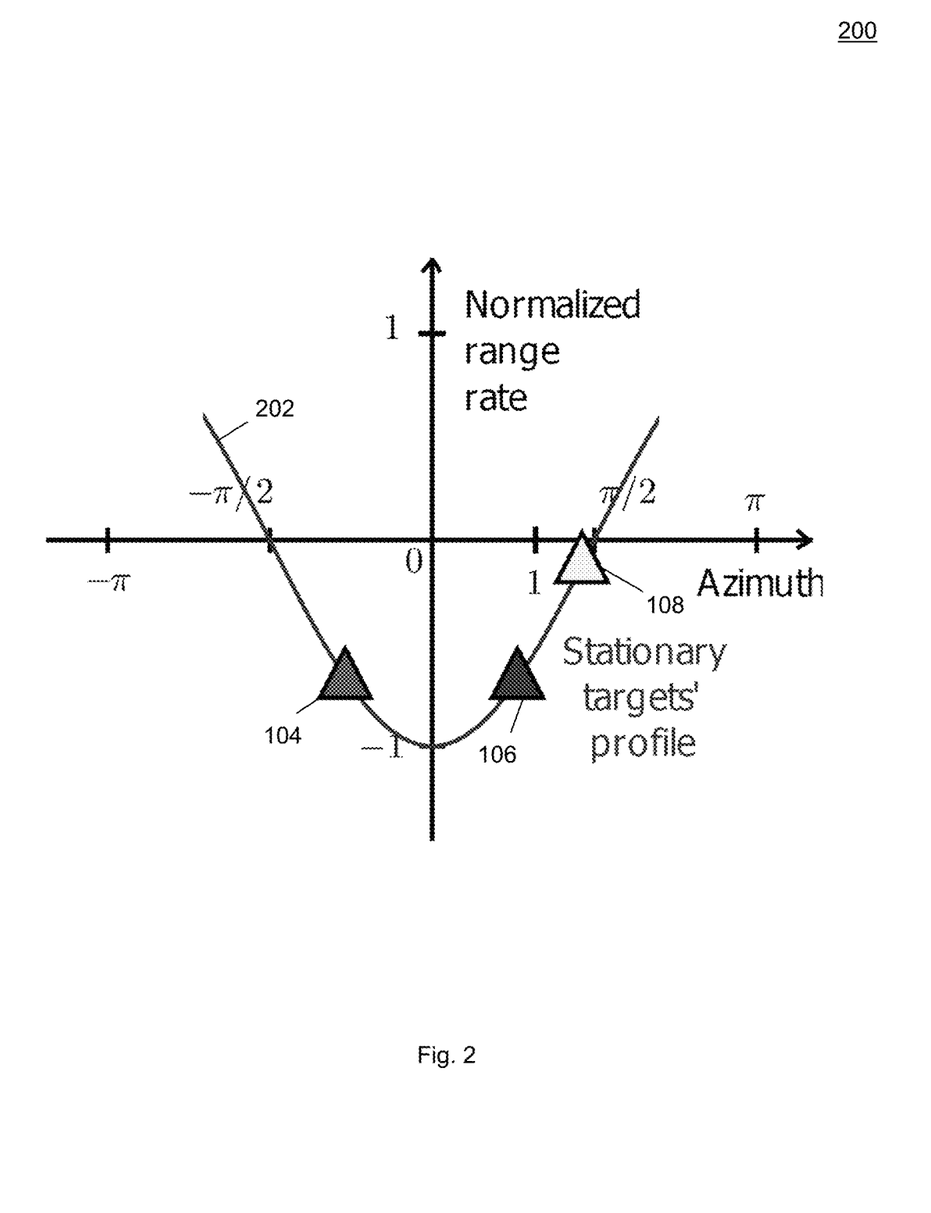
FIG. 2 a diagram illustrating the normalized range rate over the azimuth angle for stationary targets.

According to various embodiments, the follow steps 1 to 7 may be taken:

1. Apply single-scatterer test, and use only those target responses (called here detections) which pass this test.
2. Calculate the ratio between the target's range rate $\dot{r}$ and sensor's effective normalized velocity $\rho = \dot{r}/v_{\mathit{eff}}$ (for example measurement data provided by the IMU (inertial measurement unit) and/or the vehicle speed may be used).
3. Filter targets according to $\rho$. If e.g. a response from stationary targets having an azimuth angle between +30° and +90° needs to be used, then only detections having the following effective normalized Doppler may be accepted: $\cos(90°) \leq \rho \leq \cos(30°)$.
4. Estimate the target's angle of arrival (AOA) using the assumption that it is stationary: $\hat{\theta} = \cos^{-1}(\rho)$. This step is in accordance to the cosine-shaped normalized velocity profile described by stationary targets where target's normalized effective range rate is plotted vs effective azimuth angle of arrival (as shown in FIG. 2).
5. Create the corresponding ideal steering vector $a(\hat{\theta})$ based on the knowledge of the antenna array geometry and $\hat{\theta}$ estimated in step 4.
6. "Back-project" the measured steering vector x using the corresponding ideal steering vector a to the diagonal elements of the calibration matrix C by an element-wise division: $C_{j,i}=a_i(\hat{\theta})/x_i$, where $x_i$ are the elements of the measured (uncalibrated) array steering vector x.

Figure 7:
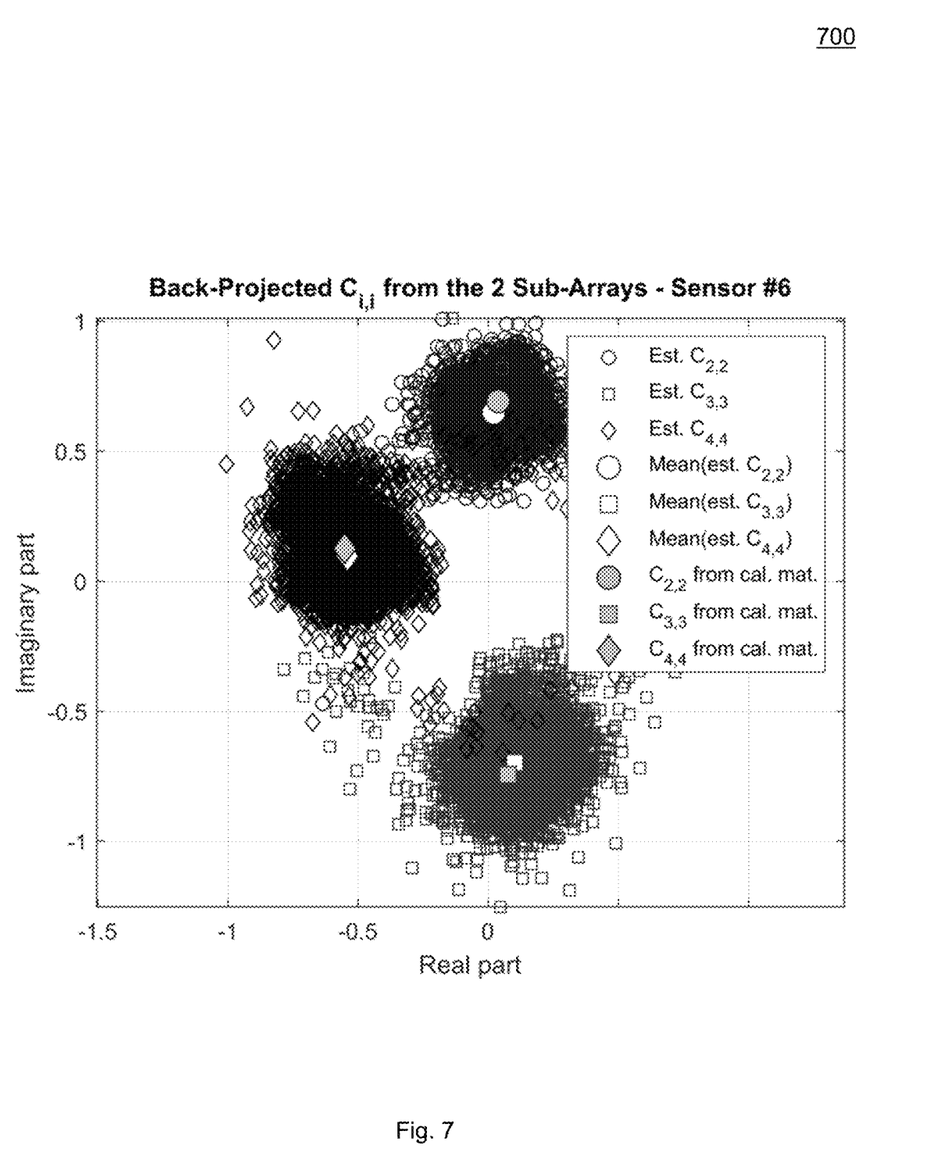
FIG. 7 an illustration of back-projected diagonal values of the calibration matrix.

7. Do clustering/averaging/filtering of the complex-valued diagonal elements $C_{j,i}$ to filter out the stationary target response (as shown in FIG. 7).

In commonly used situations, mostly stationary targets may be present at both sides of the vehicle's heading direction.

According to various embodiments, to capture mostly stationary targets, the velocity ratio ρ may be set to below 1.0, for example to cos(+/−30°)≈0.87.

Figure 1:
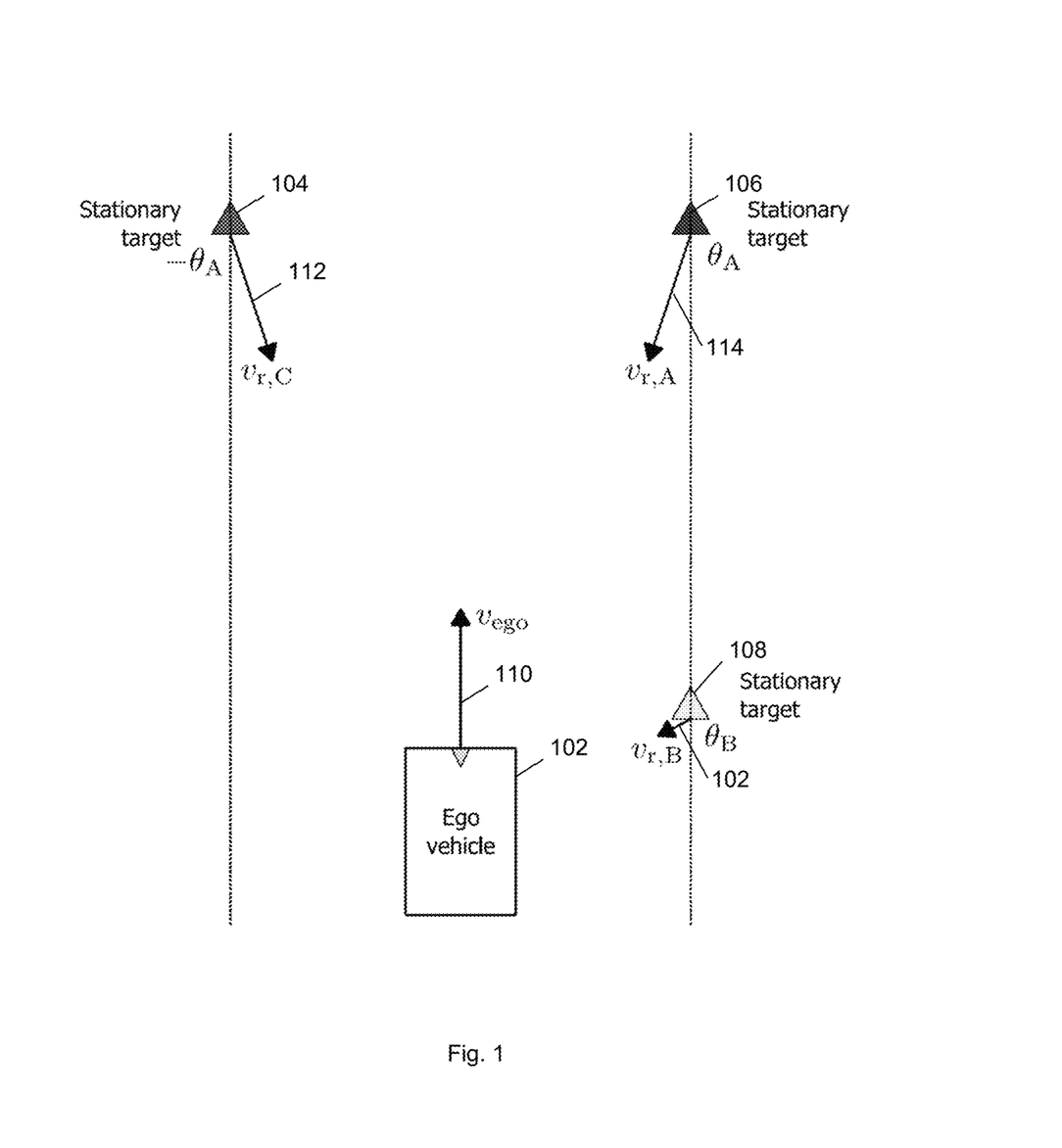
FIG. 1 an illustration of a scenario.

FIG. 1 shows an illustration 100 of a scenario in which a vehicle 102 (referred to as ego vehicle), on which a radar sensor is mounted, is driving on a street, with stationary targets 104, 106, 108. An actual velocity of the vehicle is indicated by arrow 110, and respective velocities of the stationary targets 104, 106, 108 relative to the vehicle 102 are indicated by arrows 112, 114, 116, respectively.

FIG. 2 shows a diagram 200 illustrating the normalized range rate over the azimuth angle for the stationary targets 104, 106, and 108 of the scenario of FIG. 1. As can be seen from FIG. 2, the normalized range rate over the azimuth angle for stationary objects is along curve 202, so that any points not on the curve 202 may be identified as belonging to non-stationary objects.

Figure 3:
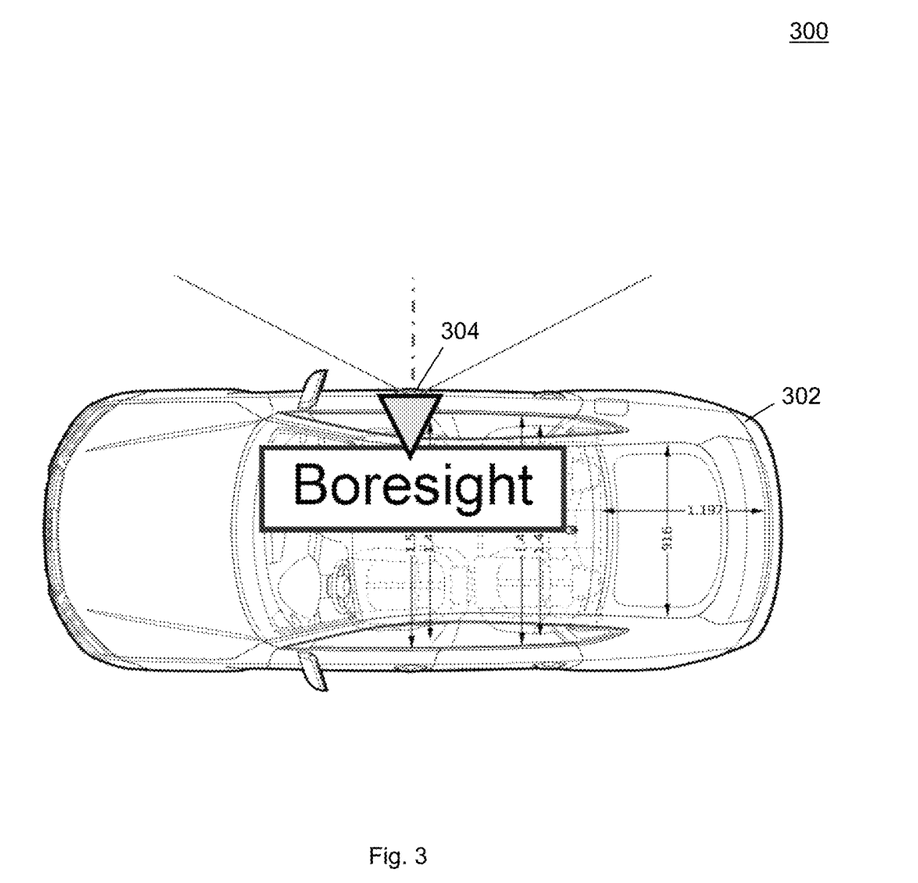
FIG. 3 an illustration of a vehicle with a radar sensor.

FIG. 3 shows an illustration 300 of a vehicle 302 with a radar sensor acquiring radar senor data sets in a boresight direction 304 (which may be defined as center-right, or as an angle of +90° relative to the forward direction of the vehicle 302).

According to various embodiments, the ego velocity and yaw rate may be determined based on the vehicle's IMU. From these two parameters, the stationary target profile may be determined. It will be understood that most of the detections are stationary.

Figure 4:
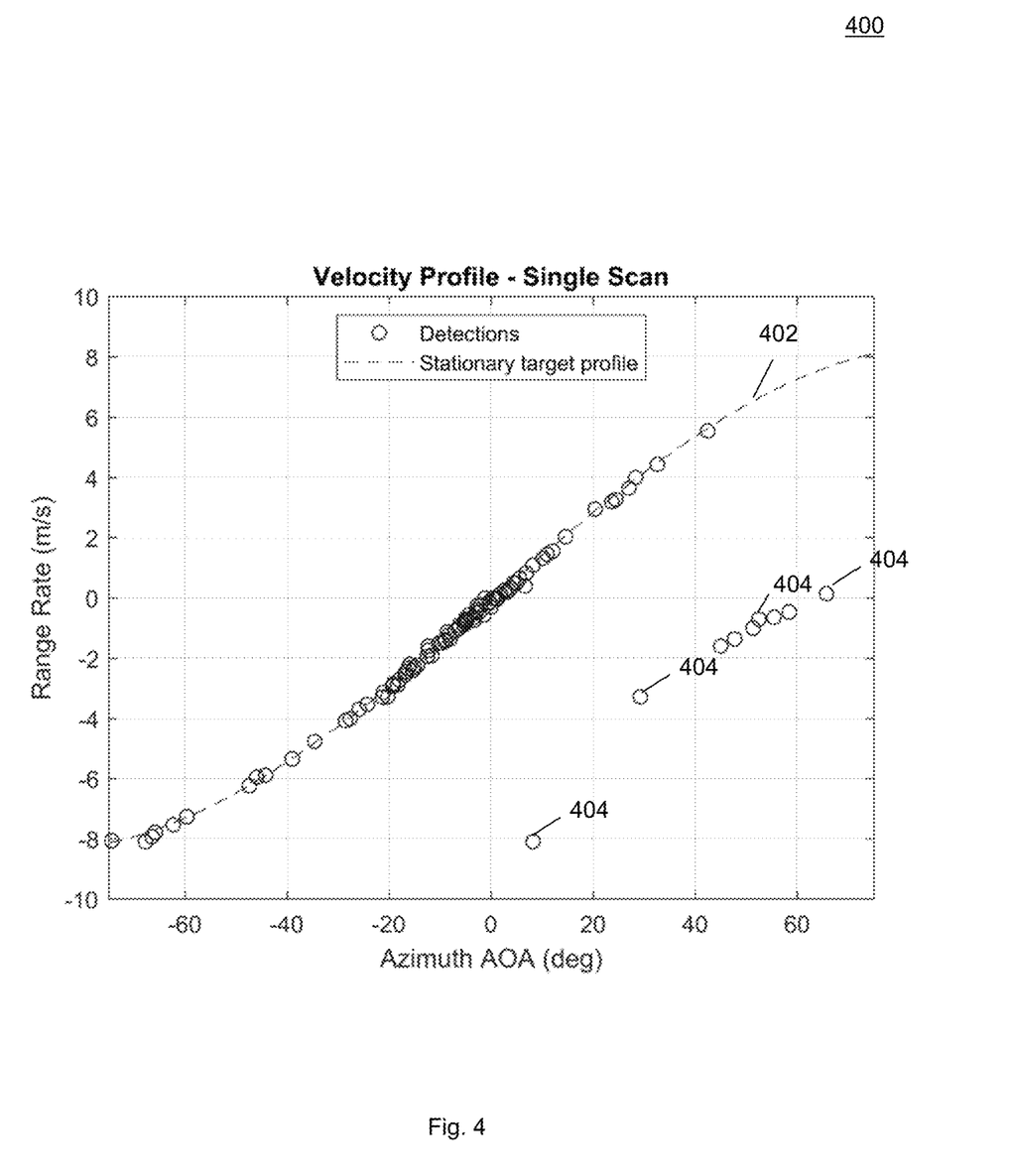
FIG. 4 a diagram illustrating a velocity profile of a single scan.

FIG. 4 shows a diagram 400 illustrating a velocity profile of a single scan. The range rate is illustrated over the azimuth angle. Detections are illustrated by circles, and the stationary target profile 402 is indicated by dashed line. As can be seen, most detections are on or close to the stationary target profile 402, since these detections are related to stationary targets. Detections which are not on or close to the stationary target profile 402 (like for example detections 404) are related to non-stationary targets (in other words: moving targets).

Figure 5:
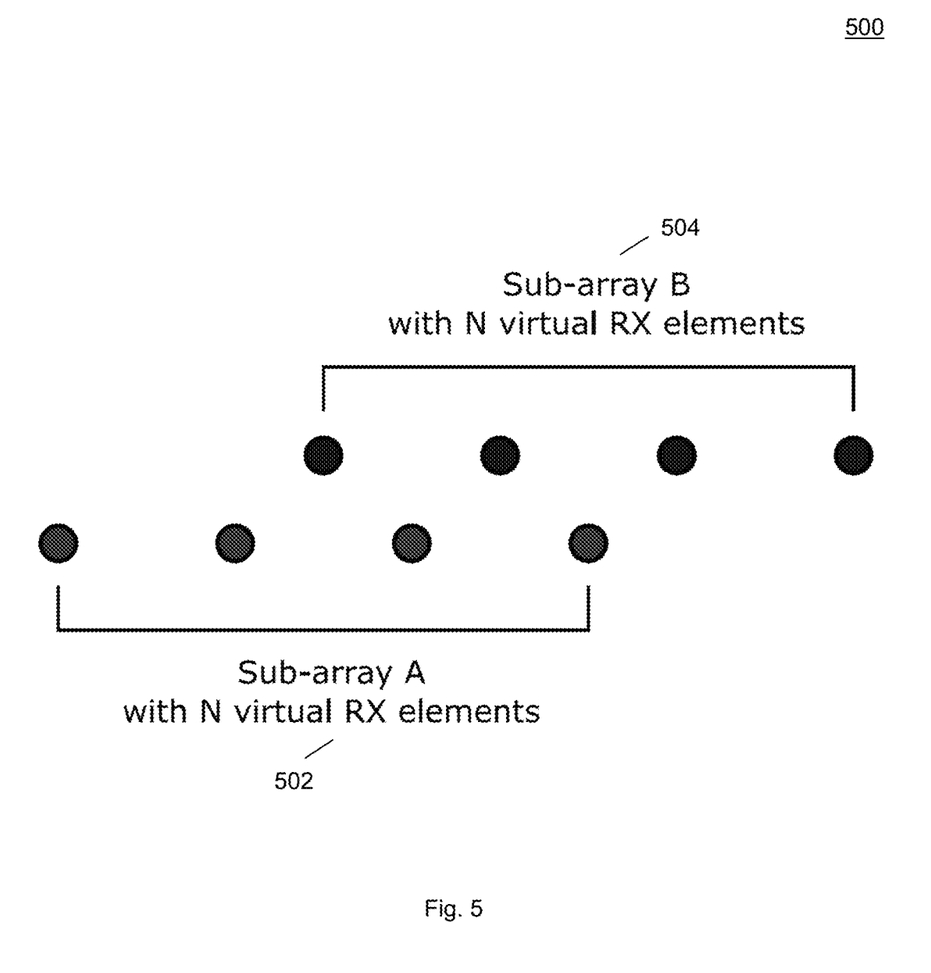
FIG. 5 an illustration of a radar sensor.

FIG. 5 shows an illustration 500 of a radar sensor, for example an SRR4 sensor with 2 transmitters (TX) and 4 receivers (RX). The SRR4 radar sensor may have 4 physical RX channels.

According to various embodiments, 2 sub-arrays may be used (for example a lower sub-array A (502) and an upper sub-array B (504), each having 4 virtual RX channels).

The back-projection may be carried out separately for the two sub-arrays to obtain $C_{i,i,A}$ and $C_{i,i,B}$. The final result may be an average: $C_{i,i}=0.5\ (C_{i,i,A}+C_{i,i,B})$.

Figure 6:
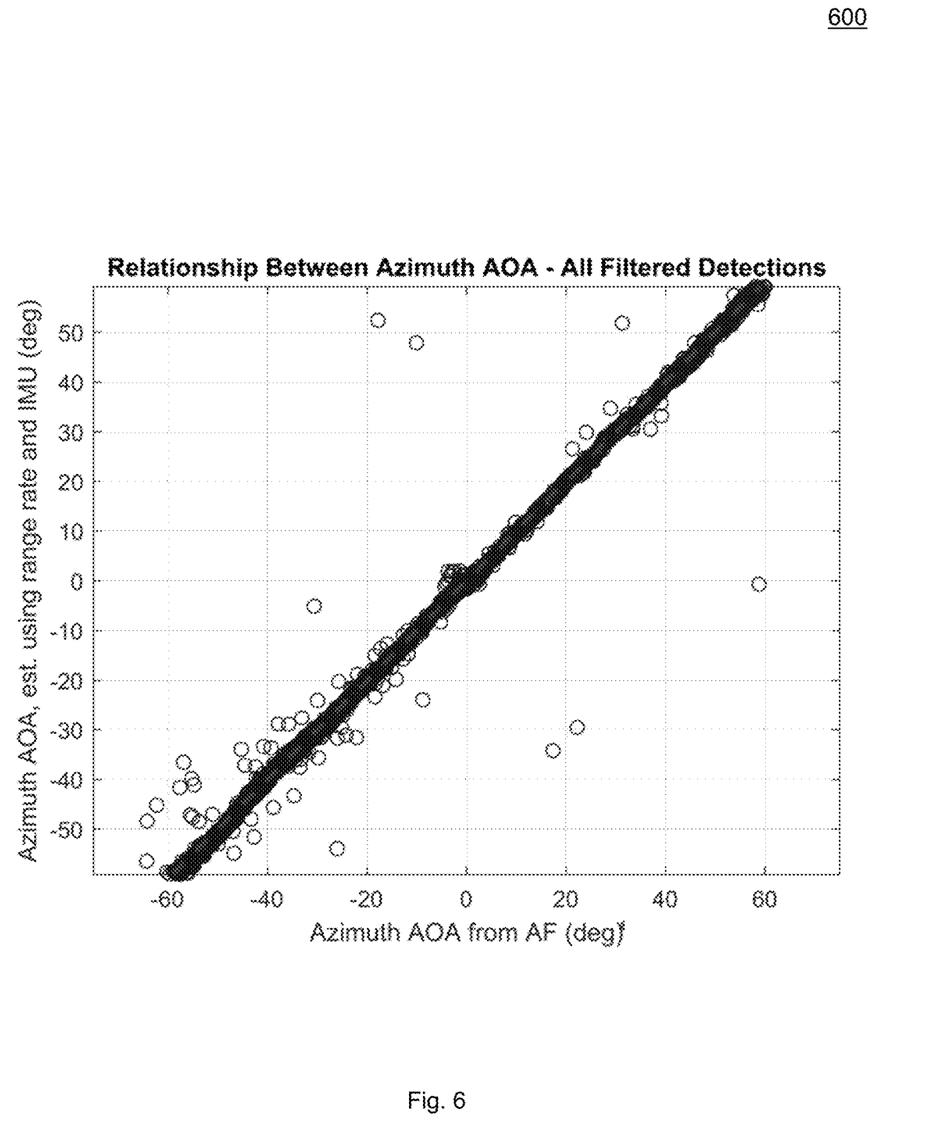
FIG. 6 an illustration of the azimuth angle of arrival matching.

FIG. 6 shows an illustration 600 of the azimuth angle of arrival matching. FIG. 6 shows the matching between the relative azimuth angle of arrival (AOA) estimated by the angle finding (AF) based on Doppler angle estimation (and assumption of targets' stationarity). As can be seen, most of the circles indicating detections are provided along a line (which appears to be a bold line by the large amount of overlapping circles). Most of the detections (and thus, most of the circles) are on a line (which appears to be the bold line in FIG. 6) corresponding to an ideal one-to-one mapping between the angle finding result obtained using a full calibration matrix (obtained from chamber measurements) on the X axis, and the estimated Doppler angle (azimuth angle using the assumption of targets' stationarity) on the Y axis.

Filtering of detections may be based on SST (<=0.025), SNR (signal-to-noise ratio)>=20 dB, and V_ego>=7 m/s.

FIG. 7 shows an illustration 700 of back-projected diagonal values of the calibration matrix C. Each back-projected vector c=diag(C) is normalized such that its first element is $C_{1,1}$=1+j0. FIG. 7 shows the distribution of the remaining 3 complex elements of c.

Figure 8:
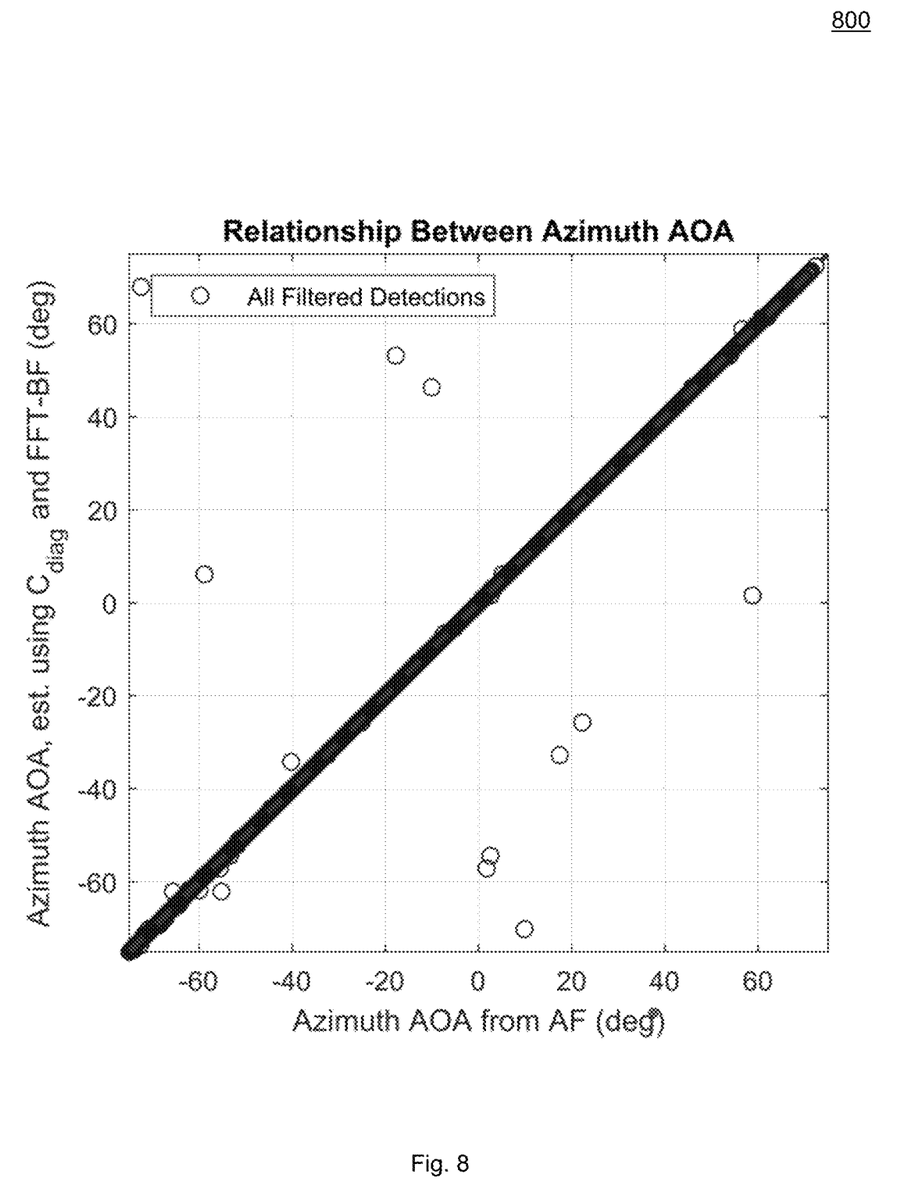
FIG. 8 an illustration of matching of azimuth angle of arrival.

FIG. 8 shows an illustration 800 of the matching between the azimuth angle of arrival (AOA) estimated by a commonly used angle finding (AF) approach using the full 8×8 C matrix from chamber and one using standard FFT (fast Fourier transform) beamforming where the raw beam vectors are calibrated by the method according to various embodiments. Filtering of detections is based on SST (<=0.025), all SNR values, and a V_ego values.

Figure 9:
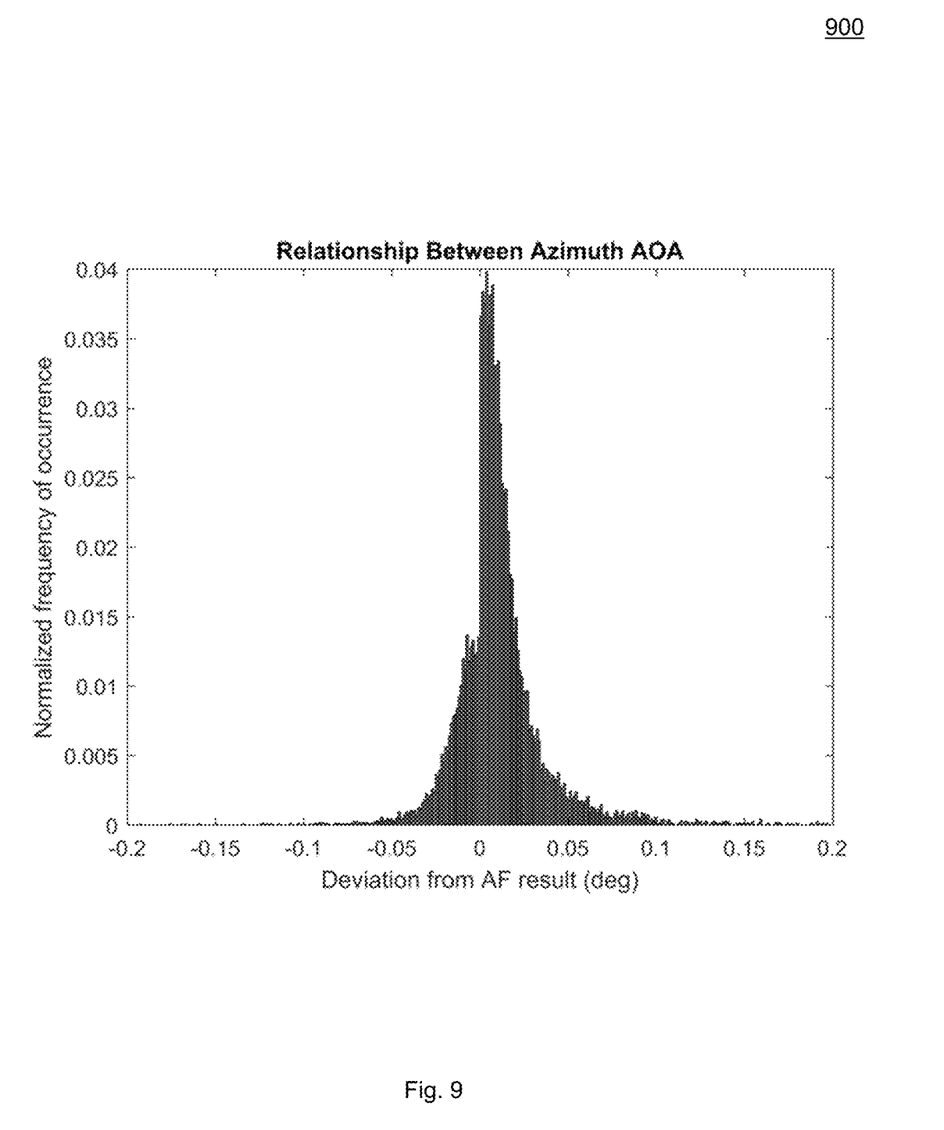
FIG. 9 an illustration of matching of azimuth angle of arrival.

FIG. 9 shows an illustration 900 of the matching between the azimuth angle of arrival (AOA) estimated by the standard angle finding (AF) approach using the full 8×8 C matrix from chamber and one using standard FFT beamforming where the raw beam vectors are calibrated by the method according to various embodiments. Filtering of detections is based on SST (<=0.025), all SNR values, and all V_ego values.

Figure 10:
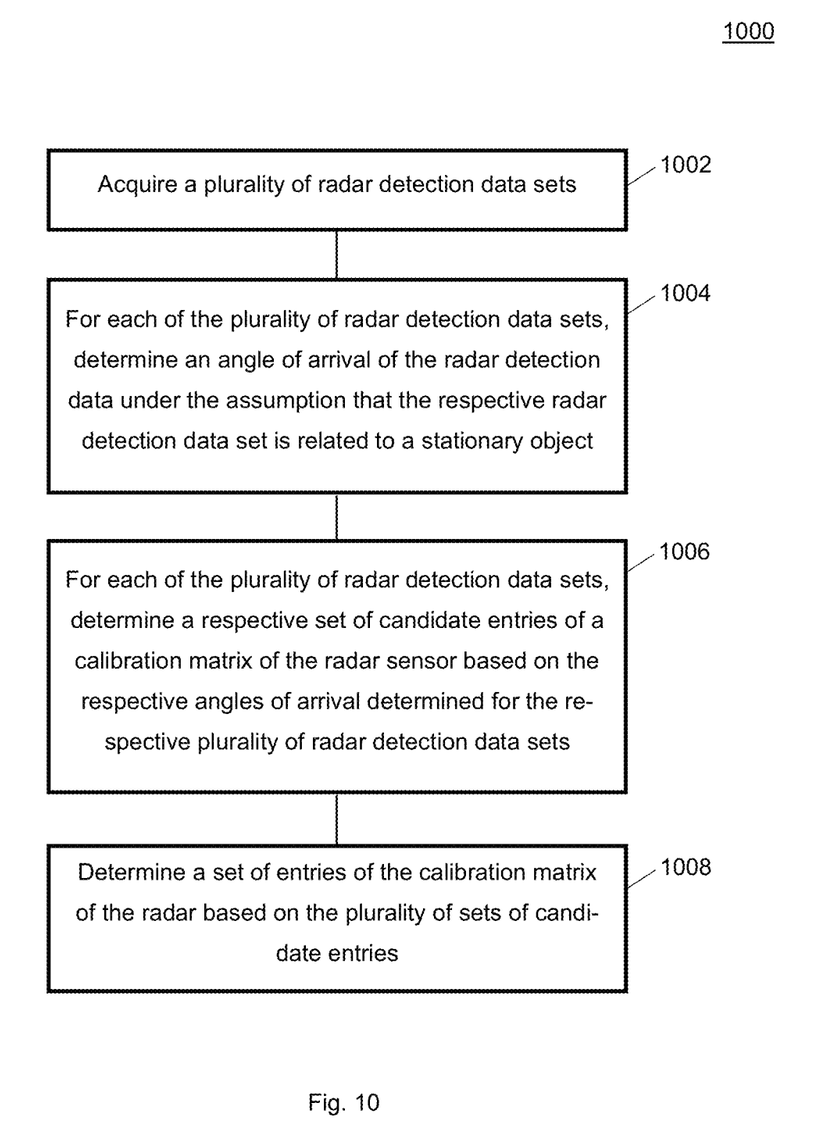
FIG. 10 a flow diagram illustrating a method for calibrating a radar sensor according to various embodiments.

FIG. 10 shows a flow diagram 1000 illustrating a method for calibrating a radar sensor according to various embodiments. At 1002, a plurality of radar detection data sets may be acquired. At 1004, for each of the plurality of radar detection data sets, an angle of arrival of the radar detection data may be determined under the assumption that the respective radar detection data set is related to a stationary object. At 1006, for each of the plurality of radar detection data sets, respective set of candidate entries of a calibration matrix of the radar sensor may be determined based on the respective angles of arrival determined for the respective plurality of radar detection data sets. At 1008, a set of entries of the calibration matrix of the radar may be determined based on the plurality of sets of candidate entries.

According to various embodiments, the method may further include, for each of the plurality of radar detection data sets, determining whether the respective radar detection data set is related to a single scatterer.

According to various embodiments, the method may further include disregarding radar detection data sets for which it is determined that they are not related to a single scatterer.

According to various embodiments, the method may further include determining odometry data related to an object on which a sensor acquiring the plurality of radar detections data sets is mounted.

According to various embodiments, the odometry data may include or may be a speed of the object and/or a yaw rate of the object.

According to various embodiments, the respective set of candidate entries may be determined further based on the odometry data.

According to various embodiments, each set of candidate entries may include or may be diagonal elements of the calibration matrix.

According to various embodiments, each set of entries may include or may be diagonal elements of the calibration matrix.

According to various embodiments, the method may further include determining a Doppler frequency shift for each of the plurality of radar detection data sets.

According to various embodiments, the respective set of candidate entries may be determined based on the Doppler frequency shift.

Each of the steps 1002, 1004, 1006, 1008 and the further steps described above may be performed by computer hardware components.

With the method according to various embodiments, the diagonal elements of the calibration matrix may be determined. No factory measurements for the radar sensor may be needed. Input to the method may include the vehicle's odometry (for example including speed and yaw rate).

Prefiltering may be provided using single-scatterer test (SST) as first step to filter radar detections before using them for calibration.

Doppler frequency shift measured by radar may be used and normalization of it may be performed by the effective sensor's speed and yaw rate being derived from vehicle's odometry instrument.

Based on that ratio, a corresponding azimuth angle, also called "Doppler angle" may be calculated assuming that the radar response comes from a stationary target.

The diagonal matrix elements may be estimated for each filtered target response using Doppler angle. Statistical methods may be applied for each diagonal matrix element to filter out non-stationary responses after multiple target responses have been accumulated over time.

The method according to various embodiments may be applied for any array configuration. No factory measurements may be needed. Any phase and gain inconsistency may be allowed.

Figure 11:
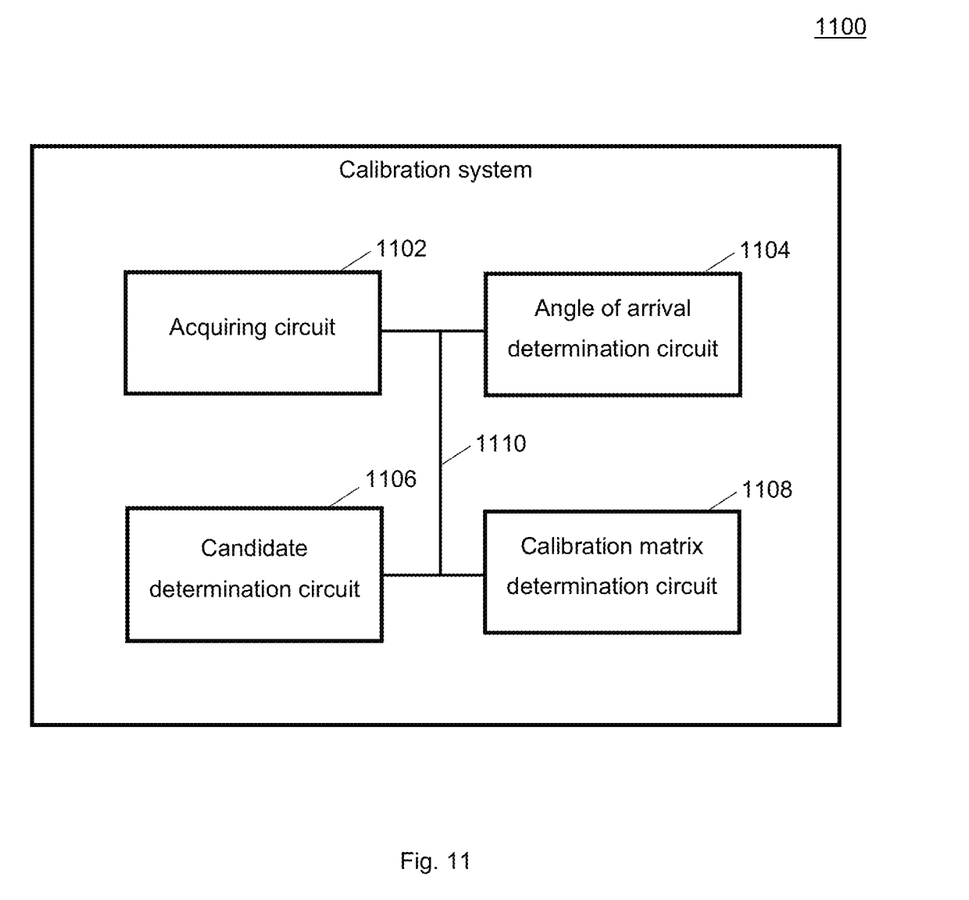
FIG. 11 a calibration system according to various embodiments.

FIG. 11 shows a calibration system 1100 according to various embodiments. The calibration system 1100 may include an acquiring circuit 1102, an angle of arrival determination circuit 1104, a candidate determination circuit 1106, and a calibration matrix determination circuit 1108.

The acquiring circuit 1102 may be configured to acquire a plurality of radar detection data sets.

The angle of arrival determination circuit 1104 may be configured to determine, for each of the plurality of radar detection data sets, an angle of arrival of the radar detection data under the assumption that the respective radar detection data set is related to a stationary object.

The candidate determination circuit 1106 may be configured to determine, for each of the plurality of radar detection data sets, a respective set of candidate entries of a calibration matrix of the radar sensor based on the respective angles of arrival determined for the respective plurality of radar detection data sets.

The calibration matrix determination circuit 1108 may be configured to determine a set of entries of the calibration matrix of the radar based on the plurality of sets of candidate entries.

The acquiring circuit 1102, the angle of arrival determination circuit 1104, the candidate determination circuit 1106, and the calibration matrix determination circuit 1108 may be coupled with each other, e.g. via an electrical connection 1110, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 12:
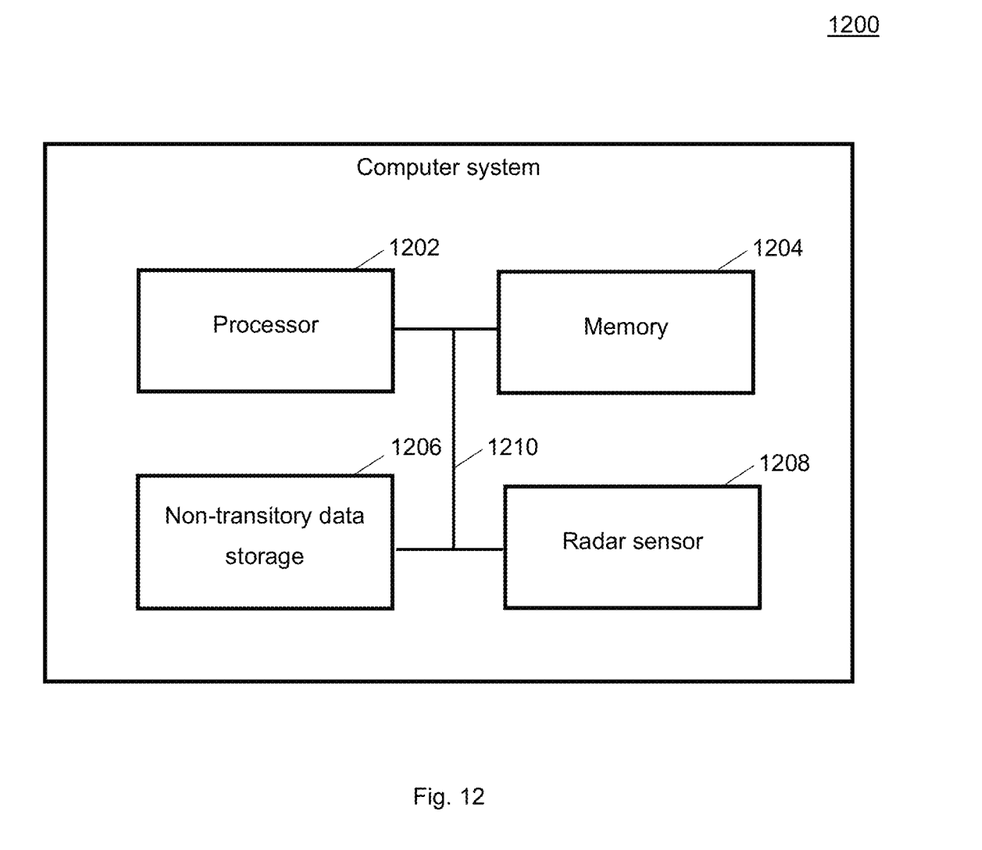
FIG. 12 a computer system with a plurality of computer hardware components configured to carry out steps of a computer implemented method for calibrating a radar sensor according to various embodiments.

FIG. 12 shows a computer system 1200 with a plurality of computer hardware components configured to carry out steps of a computer implemented method for calibrating a radar sensor according to various embodiments. The computer system 1200 may include a processor 1202, a memory 1204, and a non-transitory data storage 1206. Further, a radar sensor 1208 may be provided as part of the computer system 1200 (like illustrated in FIG. 12), or may be provided external to the computer system 1200.

The processor 1202 may carry out instructions provided in the memory 1204. The non-transitory data storage 1206 may store a computer program, including the instructions that may be transferred to the memory 1204 and then executed by the processor 1202.

The processor 1202, the memory 1204, and the non-transitory data storage 1206 may be coupled with each other, e.g. via an electrical connection 1210, such as e.g. a cable or a computer bus or via any other suitable electrical connection to exchange electrical signals. The radar sensor 1208 may be coupled to the computer system 1200, for example via an external interface, or may be provided as parts of the computer system (in other words: internal to the computer system, for example coupled via the electrical connection 1210).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the calibration system 1100 and/or for the computer system 1200.

What is claimed is:

1. A computer-implemented method comprising:
   acquiring a plurality of radar detection data sets with a radar sensor mounted on a vehicle that is driving on a street, the plurality of radar detection data sets being related to a plurality of objects, and the plurality of objects including at least one stationary object and at least one non-stationary object;
   determining sets of candidate entries of a calibration matrix of a radar sensor by, for each of the plurality of radar detection data sets by:
      determining an angle of arrival of radar detection data of the respective radar detection data set based on an assumption that the respective radar detection data set is related to a stationary object;
      determining a set of candidate entries based on the angle of arrival determined for the respective radar detection data set; and
      identifying and filtering out any radar detection data sets from the plurality of radar detection data sets that relate to a non-stationary object; and
   determining a set of entries of the calibration matrix of the radar sensor based on the sets of candidate entries for the remaining radar detection data sets from the plurality of radar detection data sets after the filtering.

2. The computer-implemented method of claim 1, further comprising, for each of the plurality of radar detection data sets, determining whether the respective radar detection data set is related to a single scatterer.

3. The computer-implemented method of claim 2, further comprising filtering out and disregarding any radar detection data sets that are not determined to be related to a single scatterer.

4. The computer-implemented method of claim 1, further comprising determining odometry data related to the vehicle on which the radar sensor that acquires the plurality of radar detection data sets is mounted.

5. The computer-implemented method of claim 4, wherein the determining the odometry data comprises determining at least one of: a speed of the vehicle or a yaw rate of the vehicle.

6. The computer-implemented method of claim 4, wherein the determining the set of candidate entries for the respective radar detection data set is based further on the odometry data.

7. The computer-implemented method of claim 1, wherein the set of candidate entries comprises diagonal elements of the calibration matrix.

8. The computer-implemented method of claim 1, wherein the set of entries comprises diagonal elements of the calibration matrix.

9. The computer-implemented method of claim 1, further comprising, for each of the plurality of radar detection data sets, determining a Doppler frequency shift for the respective radar detection data set.

10. The computer-implemented method of claim 9, wherein the determining the set of candidate entries for the respective radar detection data set is based further on the Doppler frequency shift for the respective radar detection data set.

11. A system comprising:
at least one processor;
a non-transitory computer readable medium comprising instructions that, when executed by the at least one processor, cause the system to:
acquire a plurality of radar detection data sets with a radar sensor mounted on a vehicle that is driving on a street, the plurality of radar detection data sets being related to a plurality of objects, and the plurality of objects including at least one stationary object and at least one non-stationary object;
determine sets of candidate entries of a calibration matrix of a radar sensor by, for each of the plurality of radar detection data sets by:
determining an angle of arrival of radar detection data of the respective radar detection data set based on an assumption that the respective radar detection data set is related to a stationary object;
determining a set of candidate entries based on the angle of arrival determined for the respective radar detection data set; and
identifying and filtering out any radar detection data sets from the plurality of radar detection data sets that relate to a non-stationary object; and
determine a set of entries of the calibration matrix of the radar sensor based on the sets of candidate entries for the remaining radar detection data sets from the plurality of radar detection data sets after the filtering.

12. The system of claim 11, wherein the instructions further cause the system to, for each of the plurality of radar detection data sets, determine whether the respective radar detection data set is related to a single scatterer.

13. The system of claim 12, wherein the instructions further cause the system to filter out and disregard any radar detection data sets that are not determined to be related to a single scatterer.

14. The system of claim 11, wherein:
the instructions further cause the system to determine odometry data related to the vehicle on which the radar sensor that acquires the plurality of radar detection data sets is mounted; and
the odometry data comprises at least one of: a speed of the vehicle or a yaw rate of the vehicle.

15. The system of claim 14, wherein the determination of the set of candidate entries for the respective radar detection data set is based further on the odometry data.

16. The system of claim 11, wherein the set of candidate entries comprises diagonal elements of the calibration matrix.

17. The system of claim 11, wherein the set of entries comprises diagonal elements of the calibration matrix.

18. The system of claim 11, wherein the instructions further cause the system to, for each of the plurality of radar detection data sets, determine a Doppler frequency shift for the respective radar detection data set.

19. The system of claim 18, wherein the determination of the set of candidate entries for the respective radar detection data set is based further on the Doppler frequency shift for the respective radar detection data set.

20. A non-transitory computer readable medium comprising instructions that, when executed by at least one processor, cause the at least one processor to:
acquire a plurality of radar detection data sets with a radar sensor mounted on a vehicle that is driving on a street, the plurality of radar detection data sets being related to a plurality of objects, and the plurality of objects including at least one stationary object and at least one non-stationary object;
determine sets of candidate entries of a calibration matrix of a radar sensor by, for each of the plurality of radar detection data sets by:
determining an angle of arrival of radar detection data of the respective radar detection data set based on an assumption that the respective radar detection data set is related to a stationary object; determining a set of candidate entries based on the angle of arrival determined for the respective radar detection data set; and
identifying and filtering out any radar detection data sets from the plurality of radar detection data sets that relate to a non-stationary object; and
determine a set of entries of the calibration matrix of the radar sensor based on the sets of candidate entries for the remaining radar detection data sets from the radar detection data sets after the filtering.

* * * * *